Figure 1:
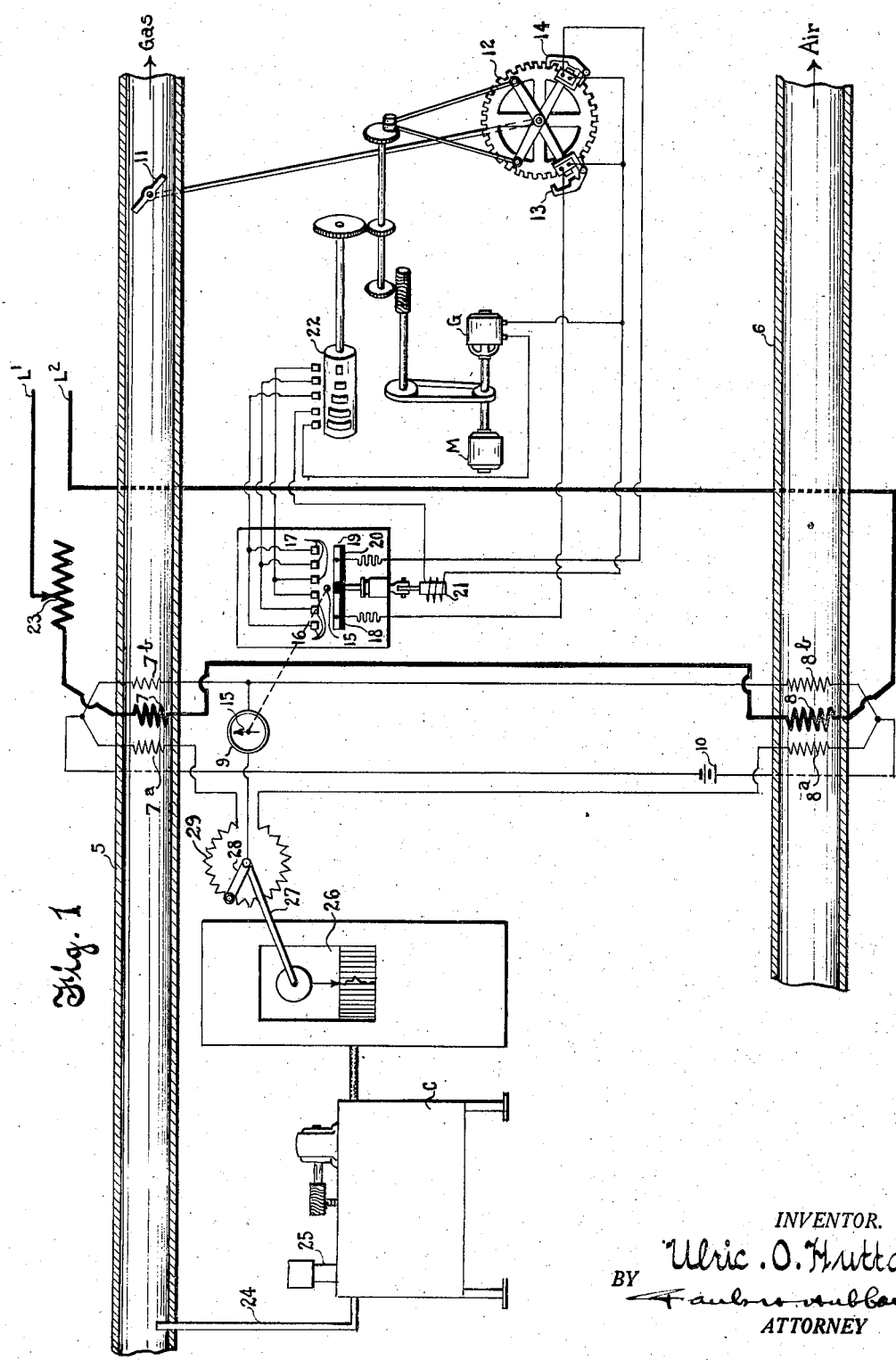

Patented June 24, 1930

1,767,588

UNITED STATES PATENT OFFICE

ULRIC O. HUTTON, OF WAUWATOSA, WISCONSIN, ASSIGNOR, BY MESNE ASSIGNMENTS, TO CUTLER-HAMMER INC., A CORPORATION OF DELAWARE

APPARATUS FOR PROPORTIONING AND CONTROLLING THE RATES OF FLOW OF FLUIDS

Application filed April 15, 1927. Serial No. 184,039.

This invention relates to apparatus for proportioning and controlling the rates of flow of fluids.

While not limited thereto the apparatus herein described is particularly adapted for proportioning and controlling the rates of flow of gas and air to be employed in combustion processes.

The invention more particularly relates to improvements in fluid proportioning apparatus of the character disclosed in the patent to Packard, No. 1,437,611 and in the patent to Wilson, No. 1,437,626, both dated December 5, 1922. Said patents severally disclose means for regulating the rates of flow of one or more of a number of fluids to provide a predetermined proportionality therebetween irrespective of variation of the respective fluids from standard conditions of temperature, pressure or saturation. However, the methods and apparatus disclosed in said patents when applied to control and proportioning of gas and air for combustion processes, for instance, will be strictly accurate only in those installations where the gas supplied is maintained of constant total heating value per unit volume; that is to say, of constant quality. According to present practice, however, the quality or total heating value per unit volume of the gas may be subject to rather wide variations; and an object of my invention is to provide means for simply and accurately compensating for such variations in quality or total heating value of the gas.

Another and more specific object is to provide means for supplying a variable unit volume of gas for each unit volume of air supplied, said unit volume of gas being variable in accordance with variations in the quality or total heating value of the latter.

Another object is to provide a device of the aforementioned character wherein means is provided for maintaining the rate of flow of air substantially constant, thereby insuring control of the gas to supply a predetermined number of potential heat units per unit of time; or in other words to provide for total heat control.

Another object is to provide a device of the above character having means whereby the number of potential heat units supplied per unit of time may be definitely varied at will.

Another object is to provide means of the character last mentioned whereby the variation effected will likewise effect a proportional variation in the rate of air supply, thus maintaining the desired or predetermined proportionality aforementioned.

Another object is to provide such a device having means for indicating or registering the total number of potential heat units supplied during any period or length of time.

Other objects and advantages of the invention will hereinafter appear.

The accompanying drawings illustrate certain embodiments of the invention which will now be described, it being understood that the invention is susceptible of embodiment in other forms without departing from the scope of the appended claims.

Figure 2:
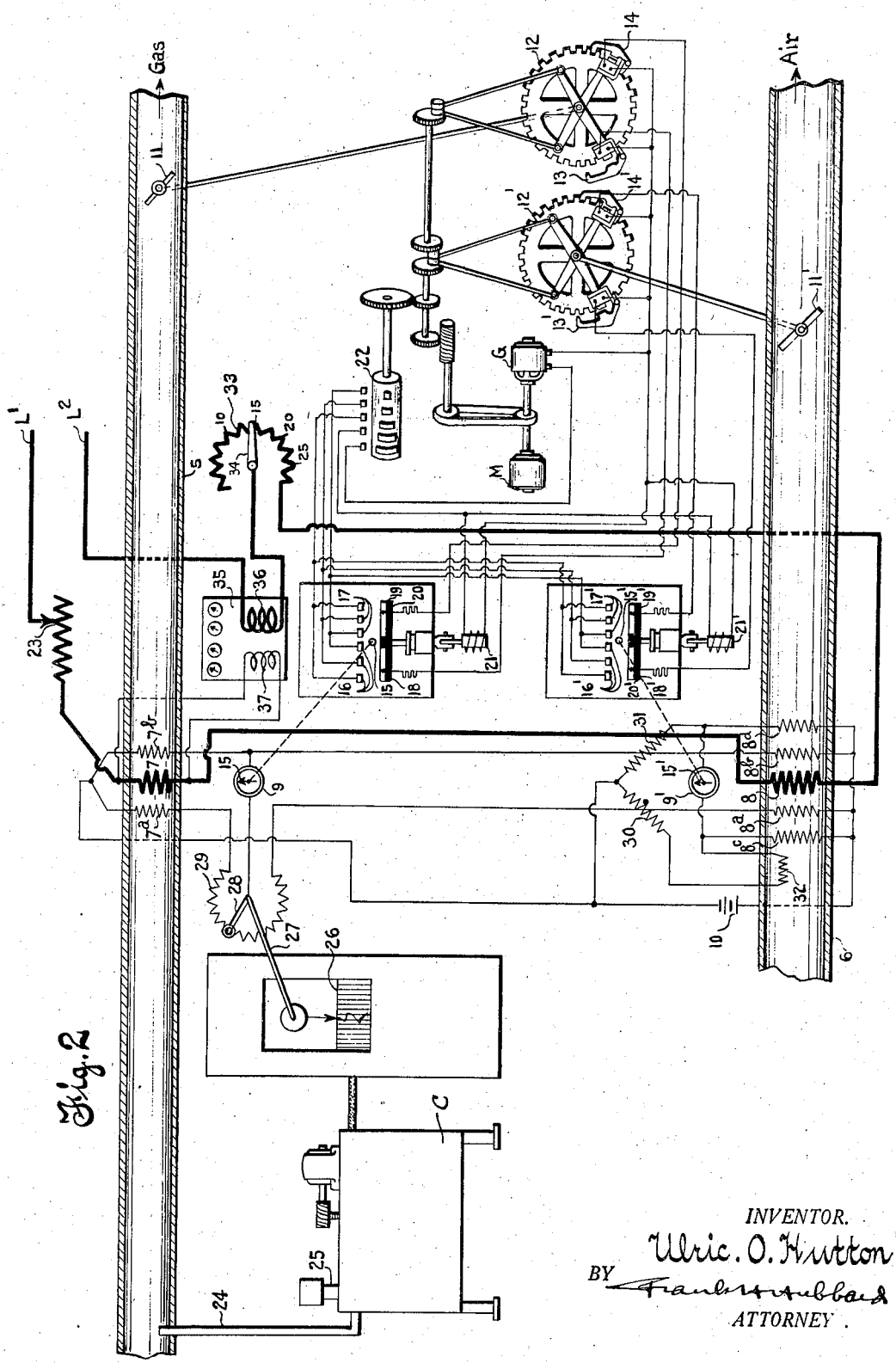

In the drawing,

Figure 1 diagrammatically illustrates one form of apparatus for carrying out my invention, and Fig. 2 diagrammatically illustrates a modification of the apparatus shown in Fig. 1.

Referring first to Fig. 1, the same illustrates apparatus for proportioning two streams of fluid, for example, gas and air flowing in conduits 5 and 6 respectively. Each conduit is provided with a Thomas meter for determining the rate of fluid flow therethrough; said meters as shown including electric heaters 7 and 8 to be connected in series with each other, whereby the same may be subjected to energization through the common energy supply lines $L^1$, $L^2$.

The voltage across lines $L^1$, $L^2$ is preferably maintained substantially constant, say at 110 volts. However, in the device illustrated in Fig. 1 it is not necessary that the voltage be maintained constant, since variations in the voltage will merely affect the sensitivity of response of the device as a whole.

The resistance values of heaters 7 and 8 are definitely proportioned with respect to each other in accordance with the relative sizes of the conduits 5 and 6; whereas if desired suitable means, such as an adjustable shunt around one of the heaters, may be provided for varying the proportionality of the resistance values thereof. This latter arrangement facilitates initial adjustment of the proportional resistance values of the heaters in accordance with the characteristics, such as specific heat, of the combustible fluid, the rate of flow of which is to be controlled.

The meters are provided with spaced thermometer resistances $7^a$, $7^b$ and $8^a$, $8^b$, respectively; said resistances being connected to each other in a manner to form a Wheatstone bridge, whereas the usual galvanometer 9 is connected across the bridge circuit. Said bridge circuit is energized in any suitable manner, as by means of a battery 10. Galvanometer 9 is adapted to control the operation of a valve 11 in the gas conduit 5.

As shown, valve 11 is operable by the motor M through a well known mechanism including a ratchet wheel 12 and electromagnetically controlled pawls 13 and 14 co-operating with said wheel. The arrangement is such that when the pawl 13 is attracted to engage the ratchet wheel the valve 11 is rotated in one direction, whereas when the pawl 14 is attracted to engage the ratchet wheel the valve 11 is rotated in the reverse direction. The galvanometer 9 controls the operating magnets of these pawls to effect release of both pawls when the needle 15 of the galvanometer is in neutral or zero position and to energize said magnets selectively upon the deflection of said needle to opposite sides of zero position. For so controlling the magnets the galvanometer 9 is provided with two series of contacts 16 and 17, to be engaged by its needle 15, and two contact bars 18 and 19 to clamp said needle against said former contacts. The contact bars 18 and 19 are carried by an insulating member 20 which is reciprocable periodically by a solenoid 21 under the control of a contact drum 22 driven by motor M. The contact drum 22 also controls the circuit connections of contacts 16 and 17, being designed to connect said contacts in circuit for graduated periods during each cycle of operation of said drum. Solenoid 21 and the magnets for operating pawls 13 and 14 are adapted to be supplied with current from generator G, but subject to control by the instrumentalities aforedescribed; said generator as shown being driven by motor M.

I have shown a rheostat 23 for initially adjusting the amount of energy input to the heaters 7 and 8 jointly; but since the amount of such energy input is more or less immaterial in a device of the character herein described, it will be obvious to those skilled in the art that said adjustable rheostat may be omitted, or a suitable value of fixed resistance may be substituted therefor.

The elements thus far described will function to provide a volumetric rate of flow of gas which is definitely proportioned with respect to the volumetric rate of flow of air. Thus assuming a given rate of flow of air and a given adjustment of valve 11 to provide a rate of flow of gas such as to effect most efficient combustion in the furnace or other burner, the valve 11 will remain in such adjusted position pending variation in the rate of flow of air or in the rate of flow of gas. Obviously, however, upon variation in the rate of flow of air the difference in temperature between thermometer resistances $8^a$ and $8^b$ will be varied, which will result in unbalancing of the Wheatstone bridge thus effecting deflection of the needle 15 of the galvanometer in one direction or the other, depending upon whether the rate of air flow has been increased or decreased. If the rate of air flow has been increased said needle will be deflected in a direction and to a degree such as to effect operation of the control instrumentalities aforedescribed for opening of valve 11 until the rate of flow of gas has again been brought to the predetermined proportionality with respect to the rate of flow of air.

A decrease in the rate of flow of air will likewise effect unbalancing of the Wheatstone bridge, whereas the resultant deflection of the galvanometer needle in the opposite direction from that aforedescribed will cause closure of valve 11 to correspondingly and proportionally reduce the rate of flow of gas. Similarly if the rate of flow of gas varies from a predetermined value as determined by the angular position of valve 11 the Wheatstone bridge will be unbalanced and the needle 15 will be deflected in a direction and to a degree to effect adjustment of said valve to a position whereby the rate of flow of gas is again rendered proportional to the rate of flow of air.

The aforedescribed elements provide simple and efficient means for maintaining a predetermined proportionality between the rates of flow of air and gas to insure the best combustion conditions, provided the quality or total heating value per unit volume of the gas remains constant. However, in many installations the gas is subject to rather wide variations in quality or total heating value per unit volume, and I have therefor provided suitable means to compensate for such variations. As shown said means comprises a calorimeter C, which is preferably of the character disclosed in the patent of H. N. Packard, No. 1,625,277 dated April 19, 1927. Said calorimeter includes means for withdrawing a continuous sample of the gas from conduit 5 through a pipe 24, which sample is supplied to a burner 25 in conjunction with combustion air and cooling fluid, also preferably comprising air, said test gas and cooling air being supplied in definitely and continuously proportioned quantities and under like conditions of temperature, pressure and saturation, as described in said Packard Patent No. 1,625,277. The action of the various elements of 'the calorimeter is fully disclosed in said Packard Patent No. 1,625,277, and since such features per se constitute no part of the present invention, further description thereof herein is deemed unnecessary, except to state that here as in said Packard patent the calorimeter described is adapted to measure total available heat per unit quantity of the gas as distinguished from the net heating values determined by certain forms of calorimeter which are not adapted to effect certain corrections which inhere in the operation of the present calorimeter.

The calorimeter may be provided with means, as shown at 26, for effecting indication of instantaneous values of the total available heat per unit quantity of the gas; whereas an extension 27 of the indicator shaft carries a contactor 28 which is therefore movable in accordance with variations in quality or total heating value per unit quantity of the gas to vary the relative amounts of resistance 29 included in circuit in series with the respective resistance thermometers $7^a$ and $8^a$, of the Wheatstone bridge. Such variations in the relative amounts of resistance 29 included in circuit in series with the respective thermometer resistances $7^a$ and $8^a$ will effect unbalancing of the bridge to a corresponding degree, and the needle 15 will be deflected in a direction and to a degree to effect an adjustment of valve 11, and consequently of the rate of flow of gas, such that a predetermined proportionality will be maintained between the total number of potential heat units supplied per unit of time in the gas and the volumetric rate of flow of air.

By including all of the resistance thermometers $7^a$, $7^b$ and $8^a$, $8^b$ in the same Wheatstone bridge circuit the valve 11 controlled by the latter will be automatically adjusted to provide a predetermined proportionality between the quantitative rates of flow of the gas and air. Moreover, by rendering the bridge circuit subject to modification in accordance with the variations in the quality or total heating value of the gas valve 11 will be additionally adjusted automatically to insure maintenance of a predetermined proportionality between the quantative rate of flow of air and the total number of heat units flowing in the gas per unit of time. Furthermore, by correlating the two pairs of thermometer resistances in the manner aforedescribed the necessity for temperature difference coils usually associated with each of the Thomas meters is obviated. Similarly, by employment of thermometer resistances composed of nickel, or a substance having similar temperature resistance characteristics, any variations in the relative basic temperatures of the air and gas will be automatically compensated for; but it is to be understood that the usual expedient of effecting a heat exchange for equalization of such basic temperatures may be resorted to, as disclosed in Fig. 4 of the Wilson patent aforementioned.

In other words, I have thus provided means for maintaining constant the ratio between the B. t. u. value of the gas and the oxygen in the air under conditions of variation in quality of the gas or in the relative rates of flow of the gas and air.

In some instances it is desirable to provide for total heat control; or in other words to provide for maintaining the supply of potential heat units per unit of time substantially constant. To obtain the best results at the point of combustion of the gas in such an installation it is additionally necessary to maintain constant a predetermined volumetric rate of supply of the air. Accordingly in Fig. 2 I have diagrammatically illustrated means for accomplishment of the desirable results just mentioned. The apparatus illustrated in Fig. 2 includes all of the elements described in connection with Fig. 1, and the corresponding parts have been given like characters of reference. The elements common to Figs. 1 and 2 function in precisely the same manner, and further description thereof is deemed unnecessary.

Thus, since the means aforedescribed provides a definite proportionality between the total number of heat units in the flow of gas and the volumetric rate of flow of air, it is obvious that if the volumetric rate of flow of air is maintained constant the total number of heat units flowing in the gas per unit of time will likewise be maintained constant. I have therefore provided means for maintaining the volumetric rate of flow of air substantially constant, said means comprising an adjustable valve $11^1$. As shown valve $11^1$ is operable by means similar to that described for effecting operation of valve 11, said means including the ratchet wheel $12^1$ and electromagnetically controlled pawls $13^1$ and $14^1$ co-operating with said wheel. As aforedescribed the arrangement is such that when the pawl $13^1$ is attracted to engage the ratchet wheel the valve $11^1$ is rotated in one direction, whereas when the pawl $14^1$ is attracted to engage the ratchet wheel the valve $11^1$ is rotated in the reverse direction.

A galvanometer $9^1$ controls the operating magnets of pawls $13^1$ and $14^1$ to effect release of both pawls when the needle $15^1$ of the galvanometer is in neutral or zero position and to energize said magnets selectively upon deflection of said needle to opposite sides of zero position. For so controlling the magnets the galvanometer is provided with two series of contacts $16^1$ and $17^1$ to be engaged by its needle 15¹, and two contact bars 18¹ and 19¹ to clamp said needle against said former contacts. The contact bars 18¹ and 19¹ are carried by an insulating member 20¹ which is reciprocable periodically by a solenoid 21¹ which is likewise under the control of contact drum 22 driven by motor M. Contact drum 22 also controls the circuit connections of contacts 16¹ and 17¹, being designed to connect said contacts in circuit for graduated periods during each cycle of operation of said drum. Solenoid 21¹ and the magnets for operating pawls 13¹ and 14¹ are likewise adapted to be supplied with current from generator G, but subject to control by the instrumentalities aforedescribed.

Galvanometer 9¹ is connected across a Wheatstone bridge, of which a pair of spaced thermometer resistances 8ᶜ and 8ᵈ form two arms, the other two arms 30 and 31 of said bridge comprising suitable fixed resistances. Included in circuit in series with resistance 30 is an auxiliary resistance 32 which is called in practice a temperature difference resistance because of its function, which function is fully described in the Wilson patent 1,437,626, and hence need not be further explained herein. The Wheatstone bridge controlling operation of galvanometer 9¹ may be supplied with energy from battery 10, along with the Wheatstone bridge controlling galvanometer 9; whereas the arrangement is such that the single heater 8 in conduit 6 may be utilized for operation in conjunction with both of said bridge circuits.

The bridge circuit including the galvanometer 9¹ is thus operable in a well known manner to maintain a substantially constant predetermined temperature rise of the air during passage thereof between the thermometer resistances 8ᶜ and 8ᵈ, by quickly effecting adjustment of valve 11¹ to maintain the rate of flow of air substantially constant. Consequently the temperature rise of the air during passage thereof between thermometer resistances 8ᵃ and 8ᵇ will likewise be maintained substantially constant, so that the Wheatstone bridge controlling galvanometer 9 remains responsive to variations in the temperature rise of the gas during passage thereof between thermometer resistances 7ᵃ and 7ᵇ and also responsive to variations in the amount of resistance 29 included in the bridge circuit due to variations in the quality or total heating value per unit volume of the gas as determined by the calorimeter. The valve 11 will therefore be automatically adjusted to provide for passage through conduit 5 of a constant predetermined number of heat units per unit of time; or in other words, to provide for total heat control. A constant predetermined proportionality will thus be maintained between the volumetric rate of flow of the air and the number of heat units flowing per unit of time.

As aforestated, the heaters 7 and 8 are connected in series so that the same are at all times adapted to dissipate proportional amounts of energy. Therefore by varying the value of energy input to the heaters jointly, the rates of flow of gas and air may be varied jointly while maintaining the predetermined proportionality between the number of potential heat units flowing per unit of time and the volumetric rate of flow of air. Accordingly I have provided a rheostat 33 having an adjustable contactor 34, whereas said rheostat may be calibrated as shown to provide for setting the apparatus to effect passage or flow of a predetermined number of potential heat units per unit of time, which setting will also provide for insuring a predetermined volumetric rate of flow of air. For instance, as shown in the drawing, the device may be set to provide for a flow of fifteen million B. t. u's. per hour with the supply of air directly proportioned with respect thereto; whereas such setting may be definitely varied at will.

If desired, an integrating watt hour meter 35 may be provided to indicate the total number of potential heat units used or supplied in any given length of time. Said meter may be of any well known construction, and as shown comprises a current coil 36 connected in series with heaters 7 and 8, and a coil 37 connected in shunt with heater 7. When such a watt hour meter is employed in conjunction with the other elements, it is necessary that the voltage across lines L¹, L² be maintained substantially constant.

As stated in connection with Fig. 1, the adjustable rheostat 23 may be omitted if desired, or a fixed resistance of predetermined value may be substituted therefor.

What I claim as new and desire to secure by Letters Patent is:

1. Apparatus for proportioning flowing gaseous fluids comprising means to regulate the volumetric rate of flow of one fluid, control means therefor including thermo-electric means subjected to influence of variations in the volumetric rate of flow of another of such fluids per se, and means to further subject said regulating means to control in accordance with variations in potential heating value of said first mentioned fluid.

2. Apparatus for proportioning flowing gaseous fluids comprising means to regulate the volumetric rate of flow of one fluid, control means therefor including thermo-electric elements respectively subjected to influence of variations in the volumetric rates of flow of such individual fluids, and means for modifying the control so effected in accordance with variations in the calorific value of certain of such fluids.

3. In combination, thermo-electric means for determining the relative volumetric rates of flow of a plurality of streams of gaseous fluid, means controlled thereby for regulating one stream and tending to maintain the volumetric rate of flow thereof proportional to the volumetric rate of flow of another of such streams, and means for effecting variations in the proportionality of said rates in accordance with variations in the calorific value of fluid in said first mentioned stream.

4. In combination, thermo-electric means for determining the relative volumetric rates of flow of a plurality of streams of gaseous fluid substantially independently of temperature, pressure and saturation conditions, means controlled thereby for regulating the flow of one fluid and tending to maintain the volumetric rate of flow thereof proportional to the volumetric rate of flow of another of such fluids, and means for modifying the regulation so effected in accordance with variations in the calorific value of said first mentioned fluid.

5. In combination, thermo-electric means for determining the relative rates of flow of a plurality of streams of gaseous fluid, means controlled thereby for regulating the flow of one stream of fluid to maintain the volumetric rate of flow thereof proportional to the volumetric rate of flow of another of said streams, and means for subjecting said first mentioned means to control in accordance with variations in the potential heating value of fluid in said first mentioned stream.

6. In apparatus for proportioning flowing gaseous fluids, the combination with thermo-electric means for determining the relative rates of flow of a plurality of such fluids, said means including an electric heater in the path of each of said fluids and means for dissipating through said heaters proportional amounts of energy, thermometer resistances arranged on opposite sides of the respective heaters and a galvanometer subjected to control by said resistances jointly, regulating means for one of said flows of fluid, means for subjecting said regulating means to control by said galvanometer, and means for further subjecting said galvanometer to control in accordance with the determinations of a calorimeter, said calorimeter being adapted to burn a continuous sample of said last mentioned fluid.

7. Apparatus for proportioning flowing gaseous fluids comprising means to regulate the volumetric rate of flow of one fluid, means including thermo-electric means for subjecting said regulating means to controlling influence in accordance with the volumetric rate of flow of another of such fluids, means for maintaining the rate of flow of said last mentioned fluid substantially constant, and means for further subjecting said regulating means to control in accordance with variations in heating value of said first mentioned fluid.

8. Apparatus for proportioning flowing gaseous fluids comprising means to regulate the volumetric rate of flow of one fluid, means including thermo-electric means for subjecting said regulating means to controlling influence in accordance with the volumetric rate of flow of another of such fluids, associated thermo-electric means for maintaining the rate of flow of said last mentioned fluid substantially constant, and means for further subjecting said regulating means to control in accordance with variations in heating value of said first mentioned fluid whereby the total heating value of said first mentioned fluid flowing in unit time is maintained substantially constant.

9. In a combustion control system, in combination, a flowing stream of combustible gaseous fluid to be burned and another flowing stream of gaseous fluid to support combustion thereof, means for regulating the volumetric rate of flow of said combustible fluid, control means for said regulating means including thermo-electric means subjected to influence in accordance with the volumetric rate of flow of said second mentioned fluid, and means for additionally subjecting said regulating means to control in accordance with variations in the heating value per unit volume of said combustible fluid whereby the proportionality between the number of heat units in said combustible fluid flow and the volumetric rate of flow of said second mentioned fluid is maintained substantially constant.

10. In a combustion control system, in combination, a flowing stream of combustible gaseous fluid to be burned and another flowing stream of gaseous fluid to support combustion thereof, means for regulating the volumetric rate of flow of said combustible fluid, control means for said regulating means including thermo-electric means subjected to influence in accordance with variations in the relative volumetric rates of flow of said first and second mentioned fluids, associated thermo-electric means for maintaining the rate of flow of said second mentioned fluid substantially constant, and means for additionally subjecting said regulating means to control in accordance with variations in the heating value per unit volume of said combustible fluid, said means comprising a calorimeter adapted to burn a continuous sample of said combustible fluid, whereby the total heating value per unit time of said combustible fluid flow and the volumetric rate of flow of the other fluid with respect to such heating value are maintained substantially constant.

11. In a combustion control system, in combination, a flow of combustible gas and a flow of air to support combustion thereof, a valve for regulating the rate of flow of said air, means for controlling said valve to maintain the rate of flow of air substantially constant, a valve for regulating the rate of flow of said gas, means controlling said valve and tending to maintain the volumetric rate of flow of said gas proportional to the rate of flow of air, said means comprising electric heaters in the paths of the gas and air respectively, and means for dissipating through said heaters proportional amounts of energy, thermometer resistances located on opposite sides of the respective heaters and means for connecting said resistances to form a Wheatstone bridge, a galvanometer connected across said bridge and means for controlling said second mentioned valve in accordance with the determinations of said galvanometer, means for modifying the determinations of said galvanometer, said means comprising a rheostat included in the circuit of said Wheatstone bridge, and means for effecting operation of said rheostat in accordance with variations in the heating value per unit volume of said gas, said last mentioned means comprising a calorimeter adapted to burn a continuous sample of said gas.

12. In a combustion control system, in combination, a flow of combustible gas and a flow of air to support combustion thereof, a valve for regulating the rate of flow of said air, means controlling said valve to maintain the rate of flow of air substantially constant, a valve for regulating the rate of flow of said gas, means controlling said valve and tending to maintain the volumetric rate of flow of said gas proportional to the rate of flow of air, said means comprising electric heaters in the paths of the gas and air respectively and means for dissipating through said heaters proportional amounts of energy, thermometer resistances located on opposite sides of the respective heaters and means for connecting said resistances to form a Wheatstone bridge, a galvanometer connected across said bridge and means for controlling said second mentioned valve in accordance with the determinations of said galvanometer, means for modifying the determinations of said galvanometer, said means comprising a rheostat included in the circuit of said Wheatstone bridge, means for effecting operation of said rheostat in accordance with variations in the heating value per unit volume of said gas, said last mentioned means comprising a calorimeter adapted to burn a continuous sample of said gas, and an integrating wattmeter associated with one of said heaters for indicating the total number of heat units in said flow of gas.

13. In a combustion control system, in combination, a flow of combustible gas and a flow of air to support combustion thereof, a valve for regulating the rate of flow of said air, means controlling said valve to maintain the rate of flow of air substantially constant, a valve for regulating the rate of flow of said gas, means controlling said valve and tending to maintain the volumetric rate of flow of said gas proportional to the rate of flow of air, said means comprising electric heaters in the paths of the gas and air respectively and means for dissipating through said heaters proportional amounts of energy, thermometer resistances located on opposite sides of the respective heaters and means for connecting said resistances to form a Wheatstone bridge, a galvanometer connected across said bridge and means for controlling said second mentioned valve in accordance with the determinations of said galvanometer, means for modifying the determinations of said galvanometer, said means comprising a rheostat included in the circuit of said Wheatstone bridge, means for effecting operation of said rheostat in accordance with variations in the heating value per unit volume of said gas, said last mentioned means comprising a calorimeter adapted to burn a continuous sample of said gas, an integrating wattmeter associated with one of said heaters for indicating the total number of heat units in said flow of gas, and means also associated with said electric heaters for jointly varying the rates of flow of said air and said gas whereby the number of heat units flowing per unit of time may be varied while maintaining a predetermined proportionality between such number of heat units and the volumetric rate of flow of air.

14. In combination, means to supply a flow of gas to be burned and means to supply a flow of air to support combustion thereof, a thermo-electric flow meter in the air supply, an adjustable valve controlled by said meter to maintain the rate of flow of air substantially constant, and additional thermo-electric flow meter in said air supply, a thermo-electric flow meter in the gas supply, means for connecting said last mentioned flow meters in a common Wheatstone bridge circuit, a valve for regulating the rate of flow of gas, means for subjecting said valve to control by said Wheatstone bridge circuit whereby the rate of flow of gas is maintained proportional to the rate of flow of air, means for modifying the control effected by said Wheatstone bridge circuit in accordance with the quality or total heating value per unit volume of said gas whereby the number of heat units flowing per unit of time is maintained substantially constant, said means comprising a calorimeter adapted to burn a continuous sample of said gas.

In witness whereof, I have hereunto subscribed my name.

ULRIC O. HUTTON.